| United States Patent [19] | [11] Patent Number: 4,752,630 |
| Sterzel et al. | [45] Date of Patent: Jun. 21, 1988 |

[54] THERMOPLASTIC POLYMER MATERIALS CONTAINING MOLECULAR INORGANIC REINFORCING FIBERS

[75] Inventors: Hans-Josef Sterzel, Dannstadt-Schauernheim; Michael Portugall, Wachenheim, both of Fed. Rep. of Germany

[73] Assignee: BASF Aktiengesellschaft, Ludwigshafen, Fed. Rep. of Germany

[21] Appl. No.: 901,580

[22] Filed: Aug. 29, 1986

[30] Foreign Application Priority Data

Sep. 20, 1985 [DE] Fed. Rep. of Germany ....... 3533574

[51] Int. Cl.$^4$ ................................................ C08K 3/22
[52] U.S. Cl. .................................... 523/307; 524/408; 524/413; 524/430; 524/497
[58] Field of Search ............... 523/307; 524/430, 413, 524/408, 497

[56] References Cited

U.S. PATENT DOCUMENTS

| 2,941,895 | 6/1960 | Haslam | 106/300 |
| 3,071,482 | 1/1963 | Miller | 106/300 |
| 3,455,732 | 7/1969 | Hathaway | 524/430 |
| 3,996,145 | 12/1976 | Hepburn | 524/430 |

*Primary Examiner*—Lewis T. Jacobs
*Attorney, Agent, or Firm*—Keil & Weinkauf

[57] ABSTRACT

Composite materials consisting of heat-resistant thermoplastic polymers and metal oxide reinforcing fibers having diameters of less than 1000 nm are prepared by hydrolyzing an organometallic compound, preferably an aluminum alkoxide, in a melt or solution of the thermoplastic under the action of a high shear gradient.

14 Claims, No Drawings

THERMOPLASTIC POLYMER MATERIALS CONTAINING MOLECULAR INORGANIC REINFORCING FIBERS

It is known that plastics can be provided with reinforcing fibers, such as glass fibers or carbon fibers as well as crystalline inorganic fibers based on titanates, alumina or silicon carbide in order to achieve a substantial increase in the rigidity and strength of these plastics.

It is also known that the mechanical properties of the composite material improve in every case as the fiber diameter decreases. For example, the breaking strength and toughness increase; the notched impact strength increases because the notch effect of the reinforcing fibers decreases with decreasing diameter, and the bonding strength becomes greater as the surface area increases. Furthermore, the strength of the reinforcing fibers themselves increases because the proportion of surface defects decreases as the diameter becomes smaller (D. W. von Krevelen, Kautschuk + Gummi, Kunststoffe 37th year, No. 4/84, page 295).

However, considerable problems are encountered when attempts are consequently made to reduce the diameter of the reinforcing fibers as far as possible. For example, individual filaments having diameters of less than 5 $\mu$m cannot be handled without damage. Inorganic fibers having diameters of about 1 $\mu$m or less can cause dangerous disorders of the respiratory organs when they are handled freely.

For these reasons, only fiber diameters greater than 3 $\mu$m (3,000 nm) have been used to date in practice.

In order to overcome the disadvantages described, attempts have been made to incorporate rigid, mesomorphic organic polymers, as molecular reinforcing fibers, into organic polymers. For this purpose, for example, poly-2,5(6)-benzimidazole, as a matrix polymer, and poly-p-phenylenebenzothiazole, as a rigid, fiber-forming polymer, are dissolved together in trifluoromethanesulfonic acid and films are cast from this solution (W. F. Hwang et al., Composites on a molecular level, J. Macromol. Sci.-Phys., B 22 (2) (1983), 231).

It is also possible to incorporate poly-p-terephthalamide as fibers into nylons as the matrix polymer; for this purpose, both polymers are dissolved together in concentrated sulfuric acid and then precipitated in water (Motowo Takayanagi et al., J. Macromol. Sci.-Phys., B 17 (4) (1980) 591).

In both cases, fibrils of the rigid polymers in the matrix polymer are obtained. The fibrils have diameters of from 5 to 40 nm and l/d ratios of from 20 to 200, high l/d ratios being advantageous.

The disadvantage of these methods is that the composites have to be prepared by dissolving the components in exotic and/or highly acidic solvents. The rigid, fiber-forming mesomorphic polymers cannot be processed by a thermoplastic method and are soluble only in the solvents listed. The fact that they are also insoluble in the melts of conventional thermoplastics which can be used as the matrix constitutes a substantial restriction to economical composite production.

It is an object of the present invention to incorporate inorganic reinforcing fibers having small diameters and high l/d ratios into theroplastic polymers which soften at above 150° C. in a very economical manner.

We have found that this object is achieved, according to the invention, if metal oxide fibers having diameters of less than 1000 nm are produced by hydrolyzing a reactive organometallic compound in a solution or melt of the matrix polymer under the action of a high shear gradient. Preferably, the fibers have diameters of from 1 to 100 nm, more preferably from 2 to 50 nm, and l/d ratios of from 5 to 1000, more preferably from 10 to 200.

This procedure differs fundamentally from known processes for the preparation of inorganic fibers, as described in DE-A No. 19 52 398, DE-A No. 21 30 315 or DE-A No. 23 59 061. There, starting from inorganic metal salts, sols of the metal oxides are produced in aqueous solution by increasing the pH. In order to be able to spin these sols or colloids, this procedure is carried out in the presence of water-soluble organic polymers, such as polyvinyl alcohol. The water-soluble organic polymers serve as spinning assistants. After the spinning procedure, the organic polymers are burnt out in order to obtain the pure inorganic fibers.

Suitable inorganic reinforcing fibers are fibers based on $TiO_2$, $SnO_2$, $ZrO_2$, $VO_2$, $UO_2$, $ThO_2$, $TiO_2/SiO_2$, $TiO_2/CaO$, $TiO_2/MgO$, $TiO_2/Al_2O_3$, $TiO_2/CaO/SiO_2$ and $Al_2O_3$. However, $Al_2O_3$ is preferably used for the materials according to the invention because $Al_2O_3$ fibers have particularly high strength and rigidity, depending on their density, reactive organoaluminum compounds are readily obtainable and amorphous Al hydroxides/oxides crystallize at relatively low temperatures of from 300° to 400° C.

The novel materials can be prepared by two methods.

In a preferred embodiment, the matrix polymer and the organoaluminum compound are dissolved in a common, preferably polar solvent. The molar amount of water required, diluted with an organic solvent, is added to this solution while stirring vigorously, and an aluminum hydroxide sol is formed. This sol is fed to a reactor, preferably an extruder, in which the organic solvent is vaporized, and the aluminum hydroxide sol is condensed and crystallized to alumina under the action of a high shear gradient and of heat.

The other embodiment is carried out in the absence of an organic solvent. In this case, the organoaluminum compound used can be mixed with the polymer melt to give a homogeneous mixture. This mixture is fed to an extruder, and both hydrolysis, and condensation and crystallization of the alumina, are carried out while feeding in steam.

Because they are readily obtainable and can be handled without danger, aluminum alkoxides are preferred organometallic compounds. The solubility of the alkoxides can be adapted to requirements by selective exchange of the alkoxide groups.

Because of the high temperatures in the crystallization stage, the only suitable polymers are those which can be processed at above 250°–300° C., eg. nylon 6, polysulfone, polyethersulfone, polyamidmide, aromatic polyetherimide, aromatic polyether ketones and aromatic polyesters.

For the first embodiment, suitable solvents are N-methylpyrrolidone, N-cyclohexylpyrrolidone, sulfolane, triphenyl phosphite, triphenyl phosphate, tricresyl phosphate and diphenyl sulfone. The ratio of polymer, organoaluminum compound and solvent is set so that the readyprepared composite material contains from 1 to 80, preferably from 5 to 50, % by volume of alumina.

To carry out the hydrolysis, the stoichiometric amount of water with or without small amounts of ammonia or amines as accelerators, is added at below the boiling point of the solution, with vigorous stirring. In order to avoid flocculation of the resulting gel at the point where dropwise addition is effected, the water is advantageously diluted with an organic solvent, the solvent present in the reaction mixture preferably being used.

In the subsequent reaction step, the temperature is increased to such an extent that solvent and organic residues eliminated during hydrolysis are distilled off. This reaction is preferably carried out under reduced pressure in a stirred kettle or another unit suitable for devolatilization, such as a thin film evaporator or filmextruder. It is important that at least the final phase of devolatilization takes place in an extruder under a shear gradient of from 50 to 5000 $s^{-1}$, preferably from 100 to 1000 $s^{-}$. In this phase, the temperature is increased to above 250° C., preferably to 300°–400° C., since temperatures of this level are required for the formation of alumina and its crystallization. The residence time at this temperature is from 1 to 100, preferably from 3 to 15, minutes.

Under the action of the shear gradient, the colloidal aluminum hydroxide particles are brought into a fibrous form, this being associated with an increase in the surface energy. The aluminum hydroxide apparently attempts to avoid this thermodynamically unfavorable form by condensation and crystallization.

After complete removal of the solvent, a melt which can be converted to granules is obtained. After extrusion, cooling, granulation and drying, the granules can be processed to shaped articles, profiles, films, hollow articles, fibers or coatings by injection molding, extrusion, blow molding, deep drawing or spinning by a conventional plastics processing method.

In the second embodiment, an organic solvent is dispensed with and hydrolysis is carried out in the extruder. For this purpose, the polymer used must be completely miscible with the organometallic compound and give a homogeneous mixture. Suitable substances are polar aluminum alkoxides, preferably aluminum tri(diethylene glycolate), which is readily obtainable by reacting 1 mole of aluminum triisopropylate with 3 moles of diethylene glycol, isopropanol being distilled off.

Mixing of the alkoxide with the polymer is carried out in an extruder. It is practical to effect the subsequent hydrolysis in a downstream extruder zone while forcing in steam. In a further downstream extruder zone, the alcohol and excess steam are stripped off under reduced pressure. The conditions for temperatures and shear gradient are the same as those in the first embodiment.

EXAMPLE 1

13 kg of N-methylpyrrolidone were initially taken in a stirred kettle, and 10 kg of a polysulfone based on bisphenol A and 4,4'-dichlorodiphenyl sulfone and having a relative viscosity of 1.57, measured in a 1% strength solution in N-methylpyrrolidone at 25° C., were added. The polysulfone was dissolved in the course of 3 hours at from 120° to 130° C.

In a second container, 20.4 kg (100 moles) of aluminum triisopropylate were melted under dry nitrogen, and the melt was brought to 130°–140° C.

The Al triisopropylate melt was added to the polysulfone solution and the temperature of the mixture was increased to 150° C.

A solution of 10 kg of N-methylpyrrolidone and 5.4 kg (300 moles) of water was metered in over 1.5 hours, while stirring vigorously. During this procedure, isopropanol distilled off. In order to distill off the isopropanol as completely as possible (18 kg, corresponding to 300 moles), the temperature was increased to 180° C.

The resulting aluminum hydroxide sol in N-methylpyrrolidone/polysulfone was pumped into a twin-screw extruder. The extruder consisted of four zones, and the sol was metered into the first heating zone. The heating zones were thermostated at 280° C., 300° C., 320° C. and 330° C. The second and third heating zones were equipped with devolatilization domes, from which the N-methylpyrrolidone and water of reaction were distilled off under from 30 to 40 mbar. To generate a high shear gradient, a part of the second and third heating zones was equipped with kneading elements. The first and fourth heating zones contained conveying elements, which avoided a vacuum breakdown.

The screw speed was set at 250 rpm (shear gradient about 400 $s^{-1}$), and the rate of transport at 4 kg/h of solution.

The polymer extrudates were removed at the extruder exit, passed through a waterbath and granulated.

The polysulfone thus obtained contained about 13% by volume (about 33% by weight) of alumina in the form of fibers having a diameter of about 10 nm and a length of about 300 nm, corresponding to an l/d ratio of 30.

EXAMPLE 2

A mixture of 20.4 kg (100 moles) of aluminum triisopropylate and 31.8 kg (300 moles) of diethylene glycol was heated to about 100° C. under dry nitrogen in a stirred kettle provided with a distillation apparatus. At about 90° C., the transalkoxidation began, isopropanol being distilled off. The temperature was slowly increased in order to keep the elimination of isopropanol at a vigorous level. After about 70–80% of the total amount of 18 kg of isopropanol had distilled off at about 140° C., the temperature was increased steadily to about 220° C.

When the reaction was complete, 5.1 kg of a polyether sulfone obtained from 4,4'-dichlorodiphenyl sulfone and 4,4'-dihydroxydiphenyl sulfone and having a relative viscosity of 1.54, measured in a 1% strength solution in N-methylpyrrolidone at 25° C., were added. The polyethersulfone had a water content of less than 0.01%.

In order to dissolve the polyethersulfone in the aluminum tri(diethylene glycolate), the temperature was increased to about 240° C. After about 3 hours, all of the polyethersulfone had dissolved.

The said solution of the polyethersulfone was fed to an extruder at 240° C. via a gear pump.

The extruder consisted of six heating zones, the first zone being the feed zone while steam at about 200° C. and under 16 bar was fed into the second zone via a flow control valve, and the fourth and fifth heating zones each had a devolatilization dome, through which diethylene glycol and excess steam were removed under about 40–60 mbar. The third, fourth and fifth heating zones contained kneading elements which provided a high shear gradient and intensive regeneration of surfaces. The temperature profile of heating zones 1 to 6 corresponded to 250° C., 250° C., 300° C., 330° C., 360° C., and 390° C. The screw speed was set at 250 rpm (shear gradient about 400 $s^{-1}$), the rate of transport at 6 kg/h of solution and the steam flow at about 1.5 kg/h.

The polymer extrudates removed were fed through a waterbath and granulated. The polyethersulfone thus obtained contained about 25% by volume (about 40% by weight) of alumina in the form of fibers having a diameter of 5 nm and a length of about 200 nm, corresponding to an l/d ratio of 40.

EXAMPLE 3
(COMPARATIVE EXAMPLE)

A polyethersulfone (relative viscosity of a 1% strength solution in N-methylpyrrolidone at 25° C.: 1.54) was mixed with an alumina staple fiber (Saffil) by compounding in a twin-screw extruder at 370° C. The proportion of fiber in the compounded polymer was 50% by weight, and the maximum fiber diameter was 3000 nm.

Results

Using a screw-type injection molding machine, the dried granules were converted to test specimens for the tensile test according to DIN 53,455 (strength) and DIN 53,457 (rigidity, modulus of elasticity). The melt temperature for the material from Example 1 was 320° C., and the melt temperature for the other Examples was 360° C.

The table below lists the results of the measurements, which show that the novel polymer materials are far superior to the prior art comparison.

| Example | Proportion of Al oxide % by weight | Tensile strength MPa | Modulus of elasticity GPa |
|---|---|---|---|
| 1 | 33 | 1,560 | 69 |
| 2 | 50 | 2,800 | 130 |
| 3 (Comparison) | 50 | 440 | 70 |

We claim:

1. A composite material consisting of a thermoplastic polymer which softens above 150° C. and which can be processed at above 250° C. and metal oxide reinforcing fibers, wherein the fibers have diameters of less than 1000 nm and are produced by hydrolyzing a reactive organometallic compound in the homogeneous phase in the thermoplastic polymer under the action of a high shear gradient of from 50 to 5000 s$^{-1}$.

2. A composite material as defined in claim 1, wherein the fibers have diameters of from 1 to 100 nm.

3. A composite material as defined in claim 1, wherein the fibers have l/d ratios of from 5 to 1000.

4. A composite material as defined in claim 1, wherein the proportion of fibers in the material is from 1 to 80% by volume.

5. A composite material as defined in claim 1, wherein the thermoplastic polymer is selected from the group consisting of nylon 6, polysulfone, polyethersulfone, aromatic polyether imide, polyamidimide, aromatic polyether ketones and aromatic polyesters.

6. A composite material as defined in claim 1, wherein the reinforcing fibers consist of alumina.

7. A process for the preparation of a composite material as defined in claim 1, wherein a metal alkoxide is mixed with the thermoplastic polymer in the liquid phase to give a homogeneous mixture, the amount of water required for hydrolysis is added and the mixture is heated at above 250° C. under the action of a shear gradient of from 50 to 5000 s$^{-1}$.

8. A process as defined in claim 7, wherein mixing of the components and hydrolysis are carried out in a high-boiling polar organic solvent.

9. A process as defined in claim 7, wherein the thermoplastic polymer is mixed with the metal alkoxide to give a homogeneous mixture, and hydrolysis is carried out in an extruder.

10. A composite material as defined in claim 1, wherein the fibers have diameters of from 2 to 50 nm.

11. A composite material as defined in claim 1, wherein the fibers have l/d ratios of from 10 to 200.

12. A composite material as defined in claim 1, wherein the proportion of fibers in the material is from 5 to 50% by volume.

13. A composite material as defined in claim 1, wherein the organometallic compound is an aluminum alkoxide.

14. A composite material as defined in claim 13, wherein the hydrolysis of the aluminum alkoxide is carried out at a temperature of from 300° to 400° C. and under a shear gradient of from 100 to 1000 s$^{-1}$.

* * * * *